UNITED STATES PATENT OFFICE 2,433,491

INSECTICIDAL COMPOSITION OF PYRETHRUM AND A METHYLENE DIOXYPHENYL SYNERGIST

Martin E. Synerholm, Hastings on Hudson, N. Y., assignor to Boyce Thompson Institute for Plant Research, Inc., a corporation of New York No Drawing. Application August 3, 1944, Serial No. 547,984

4 Claims. (Cl. 167—24)

This invention relates to insecticides for combating insect pests, such as flies, moths, mosquitoes and the like, and has for its object the provision of an improved insecticidal composition.

I have found a class of piperonal condensation products identified by the following formulae and names (1) 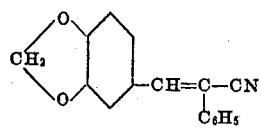

α-Phenyl-β-(3,4-methylenedioxyphenyl) acrylonitrile (2) 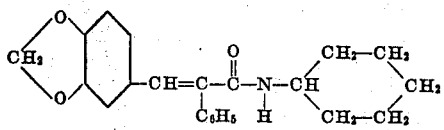

α-Phenyl-β-(3,4-methylenedioxyphenyl) N-cyclohexylacrylamide (3) 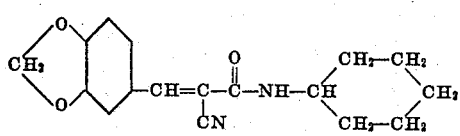

α-Cyano-β-(3,4-methylenedioxyphenyl) N-cyclohexylacrylamide which are exceptional synergistic agents in compositions comprising pyrethrin in a spray medium, advantageously a mutual solvent. Spray compositions comprising one or more of the compounds and pyrethrin in a hydrocarbon or mineral oil, such as odorless kerosene or naphtha, are especially effective insecticides.

The aforementioned condensation products increase the toxic effect of pyrethrin to a very marked extent and when they are incorporated in a suitable spraying medium with pyrethrin the resulting composition has more killing effect against such insects as the ordinary housefly than the combined effects of the pyrethrin and the compound when used alone. The invention provides an improved insecticidal composition comprising one or more compounds of the group consisting of (1) α-phenyl-β-(3,4-methylenedioxyphenyl) acrylonitrile, (2) α-phenyl-β-(3,4-methylenedioxyphenyl) N-cyclohexylacrylamide, and (3) α-cyano-β-(3,4-methylenedioxyphenyl) N-cyclohexylacrylamide and pyrenthrin in a liquid spray medium, for example, of hydrocarbon character, such as odorless kerosene or naphtha.

The compound represented by Formula 1 may be prepared by heating together piperonal with benzyl cyanide in the presence of alkali as described by Bodrous, Compt. Rend. Acad. Sci. (Paris) 153:350–351 (1911).

The acid of which compound (2) is the cyclohexylamide is not new, though the cyclohexylamide is new. The acid has been described by Bodrous, Compt. Rend. Acad. Sci. (Paris), 153:350–351 (1911). The compound represented by Formula 2 may be prepared by condensing piperonal with the alkali salt of phenyl acetic acid in the presence of acetic anhydride and pyridine, followed by conversion of the acid formed to the N-cyclohexyl amide by well known methods for preparing amides.

The acid of which compound 3 is the cyclohexyl amide has been described in Beilstein's Handbuch der organischen Chemie. 4 Aufl. Bd. 19, p. 288; Julius Springer, Berlin 1934. The condensation of piperonal with methyl cyanoacetate in the presence of sodium ethylate with subsequent conversion to the cyclohexyl amide may be used to prepare compound 3.

The synergistic effect of the compounds is shown in the following tables in which the results were obtained by the Standard Peet-Grady method with five-day old flies as described on pages 92 to 98 of "Pyrethrum flowers," by C. B. Gnadinger, 1936 edition, with compositions comprising the compounds and 0.025 gm. pyrethrin per 100 ml. of odorless kerosene:

Table I

| Compound | Grams per 100 ml. | Per Cent Kill | OTI Per Cent Kill | Per Cent Adjusted Kill |
| --- | --- | --- | --- | --- |
| (1) | 0.25 | 72 | 56 | 67 |
| (2) | 0.50 | 92 | 51 | 91 |
|     | 0.25 | 83 | 51 | 82 |
|     | 0.125 | 60 | 51 | 59 |
| (3) | 0.50 | 96 | 51 | 95 |
|     | 0.25 | 90 | 51 | 89 |
|     | 0.125 | 77 | 51 | 76 |

Table II

| Compound | G. per 100 ml. | G. pyrethrins per 100 ml. | Per Cent Kill | OTI Per Cent Kill |
| --- | --- | --- | --- | --- |
| (1) | 0.5 | 0.025 | 88 | 51 |
|     | 0.5 | 0.00 | 30 | 57 |
| (2) | 0.5 | 0.025 | 91 | 51 |
|     | 0.5 | 0.00 | 74 | 51 |
| (3) | 0.5 | 0.025 | 96 | 51 |
|     | 0.5 | 0.00 | (¹) | 65 |
| Pyrethrins alone | | 0.025 | 19 | 48 |

¹ Less than 22.

I claim:

1. An insecticidal composition comprising pyrethrin and a compound of the group consisting of α-phenyl-β-(3,4-methylenedioxyphenyl) acrylonitrile, α-phenyl-β-(3,4-methylenedioxyphenyl) N-cyclohexylacrylamide, and α-cyano-β-(3,4-methylenedioxyphenyl) N-cyclohexylacrylamide.

2. An insecticidal composition according to claim 1 in which the compound and pyrethrin are disssolved in kerosene.

3. An insecticidal composition according to claim 1 in which the compound and pyrethrin are dissolved in a mineral oil base solvent.

4. An insecticidal composition according to claim 1 in which the compound and pyrethrin are dissolved in naphtha.

MARTIN E. SYNERHOLM.

REFERENCES CITED

The following references are of record in the file of this patent:

UNITED STATES PATENTS

| Number | Name | Date |
|---|---|---|
| 2,326,350 | Gertler et al. | Aug. 10, 1943 |
| 2,335,384 | Bousquet | Nov. 30, 1943 |
| 2,362,128 | Gertler et al. | Nov. 7, 1944 |

OTHER REFERENCES

Synerholm et al., Contributions from Boyce Thompson Institute, vol. 14, No. 2, 1945, pages 79–89.

Roark et al., Chemical and Engineering News, Sept. 10, 1944, page 1457. (Copy in Library.)